US011954216B1

(12) United States Patent
Markle et al.

(10) Patent No.: US 11,954,216 B1
(45) Date of Patent: Apr. 9, 2024

(54) DETECTING DURABILITY ISSUES WITH ANOMALY DETECTION

(71) Applicant: Amazon Technologies, Inc., Seattle, WA (US)

(72) Inventors: Seth W. Markle, Seattle, WA (US); Gregory Scott Benjamin, Seattle, WA (US); Robert Devers Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 16/781,844

(22) Filed: Feb. 4, 2020

(51) Int. Cl.

| | |
|---|---|
| ***G06F 21/62*** | (2013.01) |
| ***G06F 8/65*** | (2018.01) |
| ***G06F 11/14*** | (2006.01) |
| ***G06F 16/95*** | (2019.01) |
| ***G06F 21/52*** | (2013.01) |
| ***G06N 20/00*** | (2019.01) |

(52) U.S. Cl.
CPC ............ *G06F 21/6218* (2013.01); *G06F 8/65* (2013.01); *G06F 11/1402* (2013.01); *G06F 16/95* (2019.01); *G06F 21/52* (2013.01); *G06N 20/00* (2019.01)

(58) Field of Classification Search
CPC .... G06F 21/6218; G06F 8/65; G06F 11/1402; G06F 16/95; G06F 21/52; G06N 20/00
See application file for complete search history.

(56) References Cited

U.S. PATENT DOCUMENTS

| | | | | |
|---|---|---|---|---|
| 2018/0262533 | A1* | 9/2018 | McCaig | H04L 63/1441 |
| 2019/0236149 | A1* | 8/2019 | Kuruvada | G06F 16/14 |
| 2020/0104401 | A1* | 4/2020 | Burnett | G06F 16/287 |
| 2020/0311603 | A1* | 10/2020 | Qiu | G06N 5/04 |

* cited by examiner

*Primary Examiner* — David R Lazaro
*Assistant Examiner* — Zia Khurshid
(74) *Attorney, Agent, or Firm* — Davis Wright Tremaine LLP

(57) ABSTRACT

Systems and methods are described herein for detecting the inadvertent modification to or deletion of data in a data store and taking automated action to prevent the deletion of data from becoming permanent. The described techniques may also be utilized to detect anomalous changes to a policy or affecting storage of data and taking automated action to mitigate the effects of those changes. In one example, events generated as a result of requests to perform operations on data objects in a data storage service may be obtained, where at least some of the events indicate a failure to fulfill respective requests. Data from the events may be input into a model to detect an anomaly indicative of inadvertent modification of data. As a result of detection of the anomaly, a set of operations may be initiated or performed to prevent the inadvertent modification of data from becoming permanent.

21 Claims, 8 Drawing Sheets

DETECTING DURABILITY ISSUES WITH ANOMALY DETECTION

BACKGROUND

The storage of increasingly large amounts of data and the management of that data presents many technical and logistical challenges. Computing resource service providers have developed various interfaces to help manage collections of data, include ways to organize and access data, and systems to implement various policies to manage the data. A critical aspect to managing data is durability. Because various interfaces exist to interact with data, maintaining a high level of durability is becoming more challenging, including ensuring that data is not inadvertently deleted through one of these interfaces. In addition, as these systems are being automated, data reclamation processes have bene developed to delete stale or unused data. These processes prevent further challenges to maintaining a high level of data durability.

BRIEF DESCRIPTION OF THE DRAWINGS

Various techniques will be described with reference to the drawings, in which.

DETAILED DESCRIPTION

Figure 1:
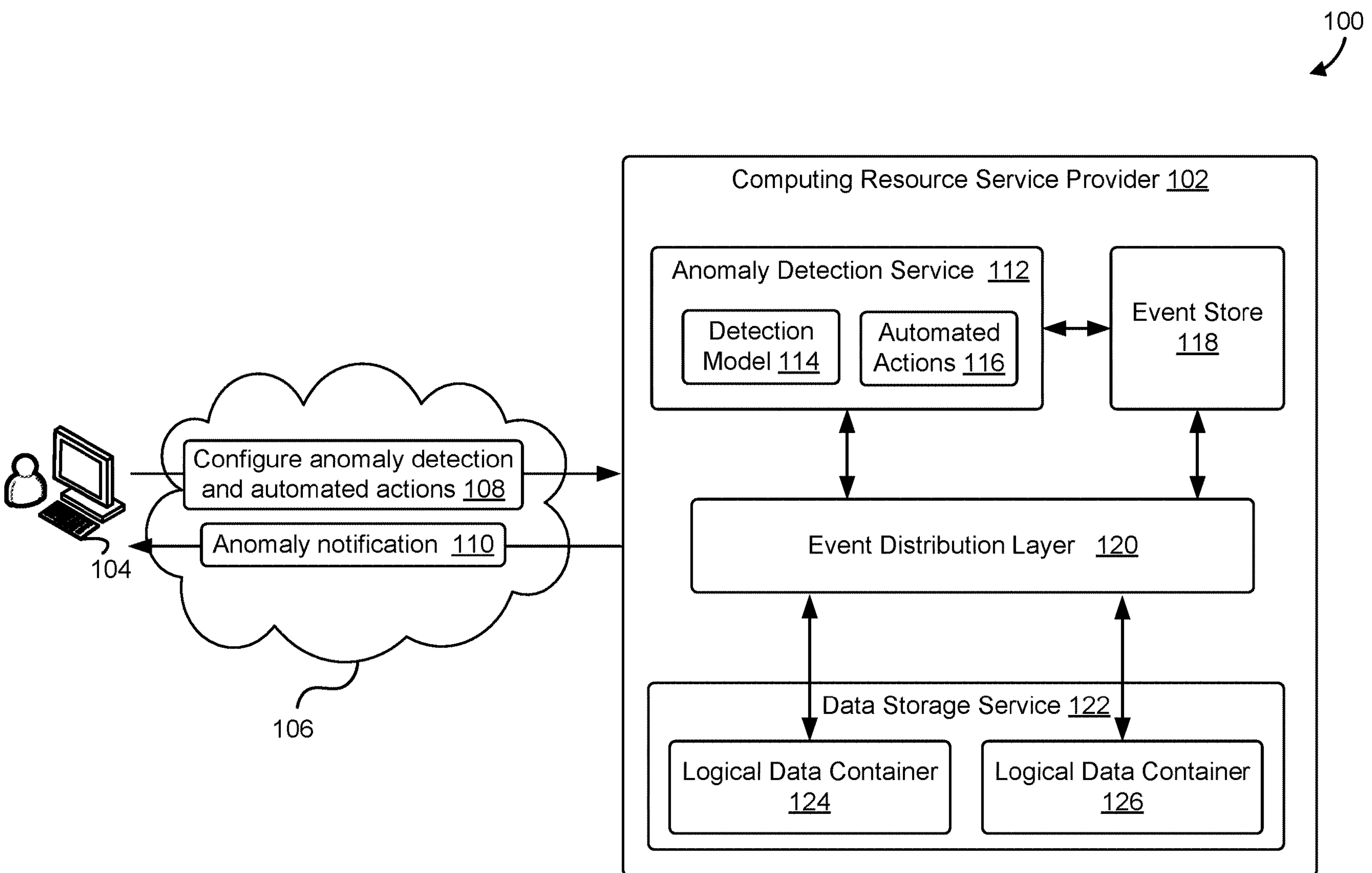
FIG. 1 illustrates an example of an anomaly detection service interacting with a data storage service, according to at least one embodiment.

Systems and methods are described herein for detecting anomalous changes to data storage policies, including the inadvertent deletion of data, in a data store and taking automated action to mitigate the effects of those changes. In one example, an anomaly detection service may obtain events of an event stream generated as a result of requests to perform read or other operations on data objects stored in a logical data container of a data storage service. The events may be generated by a layer or service interacting with a data storage service, and may include results of application programming interface (API) requests to perform various operations on data objects. Some of the events may include error code values, such as hypertext transfer protocol (HTTP) values, which may indicate that respective data objects cannot being found. These and other error codes may be used by the anomaly detection service to infer that data has been inadvertently deleted, and various actions may be configured to readily address the inadvertent deletion of data at the time it is detected. The described techniques may enable fast detection of deletion events, which may allow operators to "stop the bleeding" and rollback any harmful changes that caused the situation in the first place. Second, often incorrectly deleted data is recoverable in the period right after it was deleted. For example, customers might have configured a policy with the data storage service that allows recovery for a number of days after a delete. If the durability issue is detected quickly, it allows for operators to assess the damage and possibly take recovery actions.

In some cases, the described techniques may be used to identify inadvertent or undesirable changes to one or more policies affecting the storage and access to data stored by a data storage service. In one example, attributes of error values relating to permissions to access data objects may be used to identify unwanted modifications to a permissions policy, and automated actions taken to roll-back the changes to the policy that resulted in the errors. In a similar way, error values relating to the storage of data in different locations of classes (active v. archival storage), may be sued to identify and revert changes made to archival storage polices.

In some aspects, the events, or a subset thereof, including error values, may be input into one or more machine learning models, which may be trained on past events, some including object not found error codes or other error codes. The machine learning model may be trained, such that previous patterns or occurrences of specific error codes may be identified as anomalous deletion of data. The machine learning model may receive a new set of events, and based on past events, determine if the new set of events correspond to an anomaly, such that may indicate that data objects were mistakenly deleted. Based on an anomaly being detected, one or more workflows may be initiated to prevent further loss of data and/or to prevent the permanent deletion of the data objects that were inadvertently deleted. In some cases, this may include suspending background data reclamation to help recovery efforts, alerting all operators whose systems have changed near the onset of the event, automatically rollback changes, a combination thereof, or other actions.

In some aspects, the machine learning model may include or utilize a robust random cut forest model to detect anomalies in groups of events including at least one error code. One or multiple dimensions or attributes may be tracked for events and used to infer when a series or pattern of events indicates an anomaly across multiple dimensions. In some cases, the dimensions tracked may include one or more of a data object prefix associated with at least one of the events, time of occurrence of at least one of the events, customer tag information associated with at least one of the events, a storage class of the data object associated with at least one of the events, a logical data container of the data object associated with at least one of the events, or creation data of the data object associated with at least one of the events. In some cases, other machine learning models may be utilized, such as neural networks, or other models. By using various dimensions of past events to train a machine learning model, the described techniques may enable more accurate and quicker identification of inadvertent deletion events, and enable better recovery of the deleted data.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more effective detection of inadvertent deletion of data and the effective recovery of that data, and 2) more effective management of data stored by a data storage service, and other advantages, as will be described throughout the disclosure.

FIG. 1 illustrates an example environment 100 inducing an anomaly detection service 112 interacting with a data storage service 122, in which the described techniques may be performed Specifically, FIG. 1 depicts a client device 104, and a computing resource service provider 102, which may host or provide an anomaly detection service 112, an event distribution layer 120, an event store 118, and a data storage service 122. The client device 104 may interact with a data storage service 122 of a computing resource service provider 102 through one or more networks 106 to store and manage data in one or more logical data containers 124, 126. As descried herein, the anomaly detection service 112 may interact with the data storage service 122 via an event distribution layer 120 to detect anomalous deletion of data or changes to polices affecting data stored by the data storage service 122 and take one or more actions to prevent the deletion of that data changes from becoming permanent and/or mitigate or roll-back the policy changes.

In various embodiments, the client device 104 may be any appropriate device or collection of devices operable to send and/or receive requests, messages, or information over an appropriate network and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The client device 104 may interact with a computing resource service provider via one or more networks 106. The client device 104, either directly or through the computing resource service provider 102 may interact with data storage service 108 over one or more networks 106. The network 106 can include any appropriate network, including an intranet, the Internet, a cellular network, a local area network, a satellite network or any other such network and/or combination thereof. The data storage system 108 may be a data storage system, such as a data storage system of a computing resource service provider as described in further detail below, in reference to FIG. 8.

The computing resource service provider 102 may be a service provider that may provide various services such as data processing, data storage, software applications, security, encryption, and/or other such services. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may a provide data storage service 122 to store and manage large volumes of data. Data storage service 122 may be an on-demand data storage service, such as an object-based data storage service. In some cases, the data storage service 122 may be a service provided by a computing resource service provider 102. The data storage service 122 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The data stored in the data storage service 122 may be organized into data objects, in one or more logical data containers 122, 124. The data objects may have arbitrary sizes and may, in some instances, have constraints on size. Thus, the data storage service 122 may store numerous data objects of varying sizes. The data storage service 122 may operate as a key value store that associates data objects with identifiers of the data objects which may be used by the customer 104 to retrieve or perform other operations in connection with the data objects stored by the data storage service 122. Access to the object-based data storage service 122 may be through application programming interface (API) calls to the service or via an interface, such as a graphical user interface (GUI).

The data storage service 122 may provide isolated containers or partitions, referred to herein as logical data containers 124, 126, for storing data. The data stored in the data storage service 122 may be organized into data objects or blocks within a logical data container. In some cases, the data storage service 122 may operate as a key value store that associates data objects with identifiers of the data objects which may be used by the customer 104 to retrieve or perform other operations in connection with the data objects stored by the data storage service 122. Access to the data storage service 122 may be through application programming interface (API) calls to the service, for example from either directly from customer 104, or via the computing resource service provider 102. It should be appreciated that the data storage service 122 may additionally or alternatively provide non-object based data storage, such as block data storage, table-oriented data storage, relational databases, and the like. However, for consistency and ease of reference, the described techniques will primarily be described in relation to object-based data storage systems.

In some cases, access to files or data objects that are stored by the data storage service 122 may be secured by one or more policies stored and maintained by the data storage service 122 itself, and/or an identity and access management (IAM) system that interacts with the data storage service 122, such as provided by a computing resource service provider 102. Some or all other attributes, such as prefix, logical data container identifier, storage class, creation date, etc. may be stored in a given object's metadata. In some cases, file or object permissions, folder permissions, and attributes may be stored and managed by the data storage service 122 and/or the computing resource service provider 102, as object metadata in the data storage service 122. In some cases, if the permissions are changed on a file or data object, the data storage service 122 and/or the computing resource service provider 102 may modify the metadata of the associated objects that are stored in a logical data container 124, 126 to reflect the changes.

In some cases, the data storage service 122 may maintain and manage a permissions policy for one or more logical data containers 124, 126, which may specify what actors, devices, and/or credentials are required to access certain data objects stored in the one or more logical data containers 124, 126. In yet some aspects, the data storage service 122 may interface with an IAM system or service, which may manage one or more permissions policies.

The data storage service 122 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The event distribution layer 120 may be a service or process provided by a computing resource service provider 102. The event distribution layer 120 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The event distribution layer 120 may obtain log information from the data storage service 122 and process the log information to generate one or more notifications or events representing various operations and the status of those operations.

In some examples, the log information from logical data containers 124, 126 may include any of a number of pieces of information and be formatted in any of a number of ways. For example, the log may include entries that include an identifier of the data object or partition of data that was affected by an operation, a timestamp of the operation being performed or completed, and an identifier of the actor that initiated the operation (e.g., IP address, or other identifier). In some cases, the entry may also indicate whether the operation was performed successfully. In other cases, data of operations performed on data objects of a logical data container 124, 126 may not be contained in a log, may take various other forms, such as entries in a data stream, and the like. As used herein, a log may also refer to event data, which may not be captured in a formal log, but which may include attributes of operations performed on the data in any of a variety of formats.

In various aspects, the event distribution layer 120, which may also be a service or feature associated with a customer account of the data storage service 122 or the computing resource service provider 102, may be configurable by a customer 104 to publish certain events and store them in a specific location, such as event store 118. In some cases, the event distribution layer 120 may send the events in a stream or in batches, for example, to one or more of an event store 118 or the anomaly detection service 112. The event store 118 may be any storage device, such as may be maintained by the data storage service 122 itself, or provided by the computing resource service provider 102 separate from the data storage service 122. In some cases, the event store 118 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some cases, the event store 118 may obtain events generated or processed by the event distribution layer and store them for a configurable amount of time, such as may reflect an estimated time that event data will be relevant to a given customer 104.

In some aspects, the event distribution layer 120 may publish events and/or notify a customer 104 or push events to a customer 104. In some cases, the events may indicate a variety of operations performed on data and statuses or results of those operations (performed successfully, failed to perform, etc.). In some aspects, the events may relate to read and/or write operations performed on data objects stored and managed by the data storage service 122. In yet some cases, the events may correspond or relate to data objects being modified, such as being moved to a different storage class or storage location. In other cases, the events may correspond or relate to permission to access certain data objects, such as permission being denied. For example, an event may indicate that a new data object was created, a data object (or version thereof) was removed or deleted, a data object was restored (e.g., from an archive as may be indicated by a storage class value associated with the data object), a data object was replicated, a data object has been lost or cannot be found, and other operations that may be performed on the data.

In some aspects, the events may indicate one or more errors, such as that a data object was not found, and hence could not be read, a data object was moved to a different storage class, and is thus not readily accessible for a read operation, that permission to access a certain data object or logical data container 124, 126 has been denied (e.g., due to a recent change in a permission policy with respect to that data object/logical data container), various configuration errors, system errors, slow processing errors, and so on. It should be appreciated the above events and errors are only given by way of example, and that various other events/errors or class of events/errors may be generated by or relate to data storage service 122/event distribution layer 120, and may be utilized by the described techniques to infer the occurrence of various anomalies using various inferences models, machine learning models, and/or other techniques.

The anomaly detection service 112, as illustrated, may include one or more detection models 120 and an automated actions component 122. The anomaly detection service 112 may be a service, and may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The anomaly detection service 112 may obtain events from one or more of the event store 118 and/or the event distribution layer 120 (or in some cases directly from the data storage service). Using the events, the anomaly detection service 112 may train one or more detection models 114, such as on a per logical data container basis, a customer basis, or upon data and events not limited to a single customer or logical data container. This may include generating one or more machine learning models that may be used to detect anomalies, such as inadvertent deletion of data, in future events.

In some aspects, the events themselves, the underlying data objects, or metadata associated with the data objects may store one or more pieces of information relevant to the event/data object. In some cases, this information may include one or more of a data object prefix, time of occurrence of at least one of the events, customer tag information associated with a data object or event, a storage class of the data object, a logical data container of the data object, or creation data of the data object, and so on. This information may be used to train a detection model 114, as will be described in greater detail below. An example of different events used to train detection model 114 will be described in greater detail below in reference to FIG. 3, and an example detection model will be described in greater detail below, in reference to FIGS. 4 and 5. While the primary examples of a detection model 114 are described below in terms of machine learning models, it should be appreciated that various other pattern recognition techniques, inference models, and/or predictive algorithms may be used based on one or a number of different attributes of a set of events/errors, such as one or a combination of two or more of the following: time of occurrence, frequency of occurrence, type of event/error, type of event/error relative to other events/errors, event/error relative in time to other inferred or detected events (e.g., change to storage class archiving policy, change to permission policy, etc.), prefix of event/error, frequency of event/error with certain prefix, etc. It should also be appreciated that one or more of the above factors may be utilized by a machine learning model to detect anomalies.

The anomaly detection service 112 may also include an automated actions component 116. The automated action component 116 may be a process or instructions to perform one or more processes, as may be implemented using hardware and software, and may comprise one or more processors and memory that stores executable instructions whose execution by the one or more processors causes the computer system to perform operations described herein. The automated action component 116 may be configured, for example, by a customer 104, to initiate one or more workflows in response to the anomaly detection service 112 detecting an anomalous deletion of data stored in the data storage service 122. In some cases, the automated actions component 116 may initiate one or more processes itself, or may send a notification or instruction to cause the computing resource service provider 102 or the data service 122 itself to start one or more processes. The one or more processes may include sending a notification to the customer that data has been inadvertently deleted, pausing a data reclamation process performed by the data storage service to enable recovery of the data object for a longer period of time than would normally occur, causing the data storage service 122, or a logical data container 124, 126 to revert to a prior configuration, before changes were made that caused the inadvertent deletion of data or change to a policy affecting storage of the data objects, or a number of other processes directed at the objective of preventing the permanent deletion of the data and/or automatically rolling back inadvertent changes made to policies affecting the storage of the data objects.

As an illustrative example, a customer 104 may store data in a logical data container 124 of data storage service 122. The customer 104 may configure and may manage policies implemented by the data storage service 122 for various purposes, such as storage preferences, security and/or permission protocols, data reclamation processes, data archiving functionality, and so on. The customer 104 may also configure an event distribution service or layer 120 to track and publish various events generated from logs produced by the data storage service 122. In some aspects, the customer may configure various parameters of the anomaly detection service 112, to take certain actions when the inadvertent deletion of data is detected, such as by specifying the one or more actions, as described above, and other parameters via communications 108. In some cases, the configuration may also include one or more confidence levels, in detecting an anomalous activity, at which point will trigger one or more actions to prevent the permanent deletion of data.

The anomaly detection service 112 may then train one or more detections models based on events generated by the data storage service in response to operations performed on the customer data or other data stored by the data storage service 122. The anomaly detection service 112 may further associate and store one or more actions or workflows that are to be initiated upon detection of anomalous activity in the automated actions component 116. In some aspects, the customer 104 may provide additional training data by tagging or identifying anomalous deletion of data relative to one or more events generated by the data storage service 122.

The anomaly detection service 112 may from time to time, such as periodically or when a threshold number of events are received, or a specified amount of time elapses, obtain recent events from the event distribution layer 120 and/or the event store 118. The anomaly detection service 112 may input the recent events into the detection model 114, to determine if an anomalous deletion of data has occurred. If an anomaly is detected, such as according to the customer supplied configurations, the anomaly detection service 112 may initiate one or more actions via automated actions component 116 to prevent the permanent deletion of the data. In some aspects, this may include sending a notification 110 to the customer to enable the customer to take action to mitigate the inadvertent deletion of data.

Figure 2:
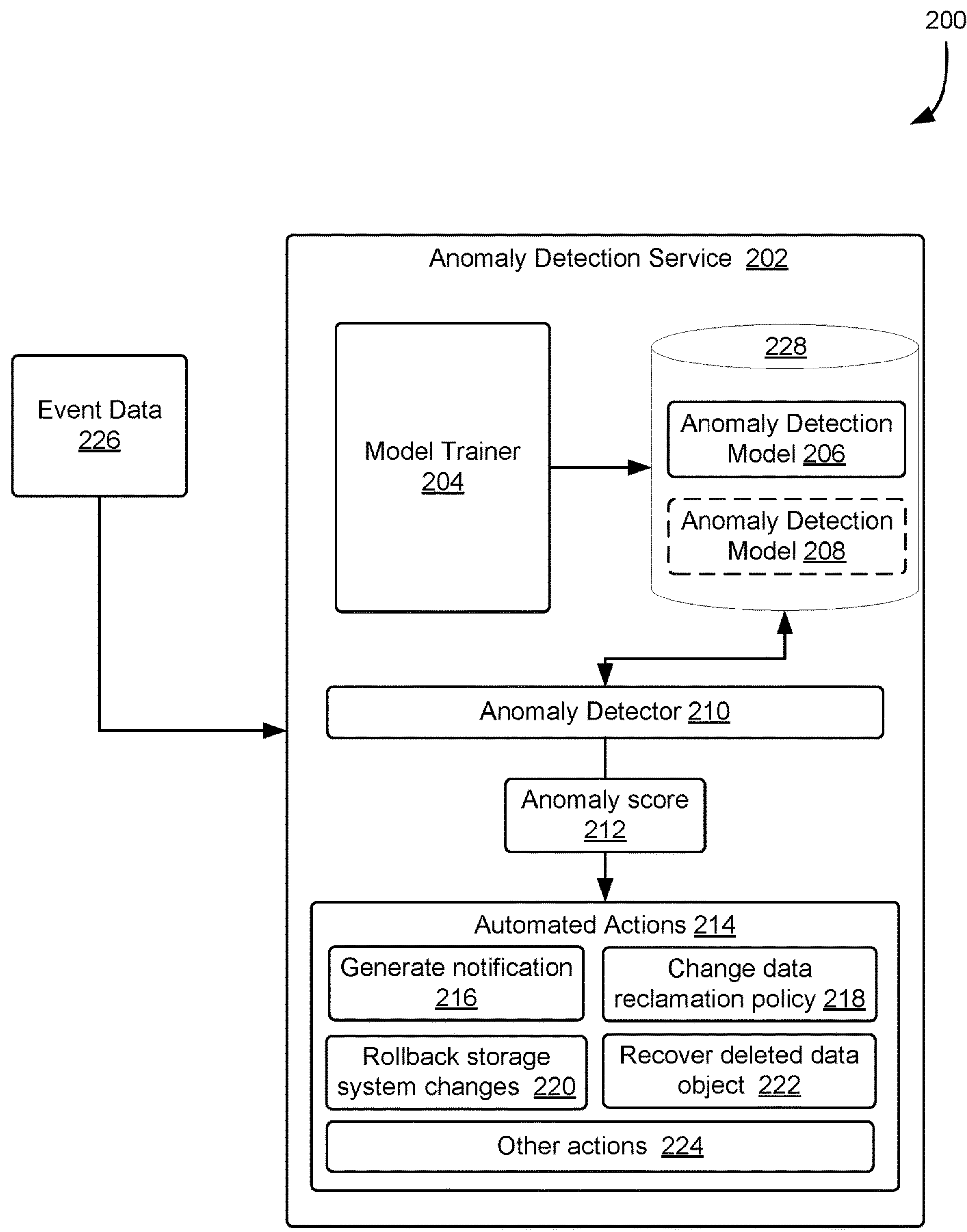
FIG. 2 illustrates an example of an anomaly detection service, according to at least one embodiment.

FIG. 2 illustrates another example 200 of an anomaly detection service 202, according to at least one embodiment. The anomaly detection service 202 may be an example of and/or may incorporate one or more aspects of anomaly detection service 112 described above in reference to FIG. 1. The anomaly detection service may obtain event data 226, for example, from a data storage service directly, or through an event distribution layer or event store, as described above in reference to FIG. 1.

As illustrated, the anomaly detection service 202 may include a model trainer 204 and a model store 228, which may be used to train and store one or more models 206, 208 to be used to detect anomalies in events generated by a data storage service or event distribution layer, as described above. The model trainer 204 may include one or more computing devices or systems (virtual or hardware) and/or instructions to perform one or more processes, as may be implemented using hardware and software, and may comprise one or more processors and memory that stores executable instructions whose execution by the one or more processors causes the computer system to obtain event data 226 and use the event data 226 to train one or more models 206, 208. The model store 228 may include one or more computing devices and/or any of a variety of memory devices to store data. Each detection model 206, 208 may be a collection of data stored in the model store 228. In some cases, each model 206, 208 may include a number of data points representing events, including various attributes, which may be associated with an anomaly score or value 212 relative to a collection of data, such as a logical data container, a customer, or some other definition of a set of data. In some aspects, the anomaly score 212 may indicate a degree by which a data point is not similar to a collection of other data points.

To train the one or more models 206, 208, the model trainer 204 may obtain a set of event data 226, which may indicate that a variety of functions were performed on data of interest. In some aspects, events may be generated as a result of API requests to perform operations on a portion of the data, such as a data object or other partition of data. The events themselves may take any of a variety of forms to indicate an operation, and a status of the performance of the operation. For example, an event may indicate that a certain data object was successfully read. Another event, such as indicating an error, may indicate that a data object was attempted to be read, but the object was not found, such that the operation was not completed. This type of error (that a data object cannot be found) may be of particular relevance to detecting whether a data object was inadvertently deleted.

For a given event or subset of events, an indication of whether the event or group of events signals an anomaly, such as the inadvertent deletion of data, may be obtained or determined. In some cases, this indication of whether an anomaly occurred for an event or subset of events, may be obtained from a customer, such as customer 104. In some cases the anomaly detection service 202 may request indications of whether certain events are congruous with an anomaly from a customer directly, such as through a configuration process in which subsets of events or patterns of events are presented and the customer is asked to identify which indicate anomalies. In some cases, the model trainer 204 may obtain a large set of events and determine, through various statistical means, which events or patterns of events indicate an anomaly. For example, the model trainer 204 may determine that over a given period of time, a certain number of a specific type of error codes normally occur (e.g. data object not found) to determine a baseline. The model trainer 204 may then set a threshold number of error codes in a time period that would indicate an anomaly based on the baseline previously determined. In some cases, other data may be used to infer that an anomaly occurred, such as the logical data container reverting to a prior configuration or policy (e.g. rollback) after the occurrence of a number of error codes, and the like. The model trainer 204 may subsequently refine the model with more data and more indications of anomalies. In some cases, various pieces of information may be gathered from various sources, such as a customer, events/logs generated by the data storage service, logs generated by or maintained by a computing resource service provider that provides the data storage service, etc.

In other examples, the models 206, 208 may be trained in various other ways, including utilizing various machine learning or other techniques, such as robust random cut forest models, neural networks, such as varieties of recurrent neural networks including long-short term memory architectures, and the like. An example of a robust random cut forest model will be described in greater detail below in reference to FIGS. 4 and 5 below.

The anomaly detection service 202 may also include a number of components or processes for detecting anomalies using the trained models 206, 208, such as an anomaly detector 210, which may generate an anomaly score 212, and an automated actions component 214 that may initiate one or more actions in the event an anomaly is detected. The anomaly detector 210 may include one or more computing devices or systems (virtual or hardware) and/or instructions to perform one or more processes, as may be implemented using hardware and software, and may comprise one or more processors and memory that stores executable instructions whose execution by the one or more processors causes the computer system to obtain new event data 226 and access one or more models 206, 208 to generate an anomaly score 212, by comparing the new event data 226 to the one or more models 206, 208. In some aspects, the model trainer 204, model store 228, and anomaly detector 210 may be an example of detection model 114, such that various processes performed by the model trainer 204, model store 228, and anomaly detector 210 may be performed in a coordinated way.

In some aspects, the model detector 210 may obtain new event data 226 directly from a data storage service or more generally a data store managing customer data, such as in an event stream in real time or near real time. In other cases, batches of event data may be pushed to the anomaly detector 210 at various intervals, in response to one or more trigger events, etc. In yet other cases, the anomaly detector may request event data at certain intervals, upon satisfaction of one or more trigger events, etc.

The anomaly detector 210, or in some cases the model 206, 208 itself, may process new event data 226 as an input into one or more of models 206, 208, to generate an output, which may take the form of an anomaly score 212. The output 212 is generated based on patterns and/or associations previously learned by machine learning model 206, 208 via a training process. The output or score 212 may simply include a binary determination as to whether an anomaly has occurred based on the new event data 226, or may include more detailed information, including a confidence score of the likelihood of an anomaly in the event data, and an identification of the event data that is responsible for the anomaly being detected. It should be appreciated that these are only example outputs, and that various other information may be included in the output 212 (such as what attributes triggered the detection of the anomaly), that output may take other forms, and so on. The output 212 may be provided to the automated action component 214. The automated action component 214 may be an example of the automated actions component 116 described above in reference to FIG. 1, and as such, various shared aspects will not be described again here.

In some cases, the automated actions component 214 may trigger or initiate one or more workflows or processes upon receiving an anomaly score 212 that indicates an anomaly occurred or likely occurred. The one or more workflows may include generating a notification 216, which may be sent immediately to a relevant customer. In some cases, the notification when sent immediately upon detection of an anomaly, may enable the customer to retrieve the anomalously deleted data from a temporary data store, such as before the data is permanently deleted via a data reclamation process. In some cases, this action may be beneficially used in combination with other workflows 218, 220, 222, or 224 to prevent the loss of data.

The one or more workflows may additionally or alternatively include changing a data reclamation policy 218 of the data storage service, to for example, extend a time period during which deleted data is temporarily stored before being permanently deleted. In some cases, this action may be beneficially used in combination with other workflows 216, 220, 222, or 224 to prevent the loss of data.

The one or more workflows may additionally or alternatively include rolling back storage system changes 220, such that may have occurred prior to events occurring that led to the detection of an anomaly. In some cases, this action may be taken to prevent further anomalies, and as such, may be beneficially used in combination with other workflows 216, 218, 222, or 224 to prevent the loss of data.

The one or more workflows may additionally or alternatively include recovering the deleted data object 222. In some cases, this may include retrieving the data from a delete cha-cha before it is permanently deleted, such as via a data reclamation process, and storing the data in longer term storage until a customer can confirm whether the data should, in fact, be deleted. In some cases, this action may be beneficially used in combination with other workflows 216, 218, 220, or 224 to prevent the loss of data. In some cases, other actions 224 may be taken to mitigate loss of data and/or prevent the permanent deletion of data.

It should be appreciated that one or more of automated actions 216, 218, 220, 222, and/or 224 may be performed globally, such as on a logical data container, such as containers 124, 126, a customer account that may include more than one container 124, 126, and so on. In other cases, one or more of actions 216, 218, 220, 222, and/or 224 may be performed on a more granular basis, such as on a subset of data objects in a logical data container, defined by, for example, time, prefix, tagging information, and the like.

In some cases, when the output 212 indicates an anomaly, the output may be fed back into the relevant model 206, 208 to further train the model. In some cases, the output may be confirmed to be an anomaly before it is fed back into the model 206, 208, to ensure that the model is trained on accurate training data. In other cases, only outputs that are associated with a confidence score above a threshold may be fed back into the models 206, 208.

Figure 3:
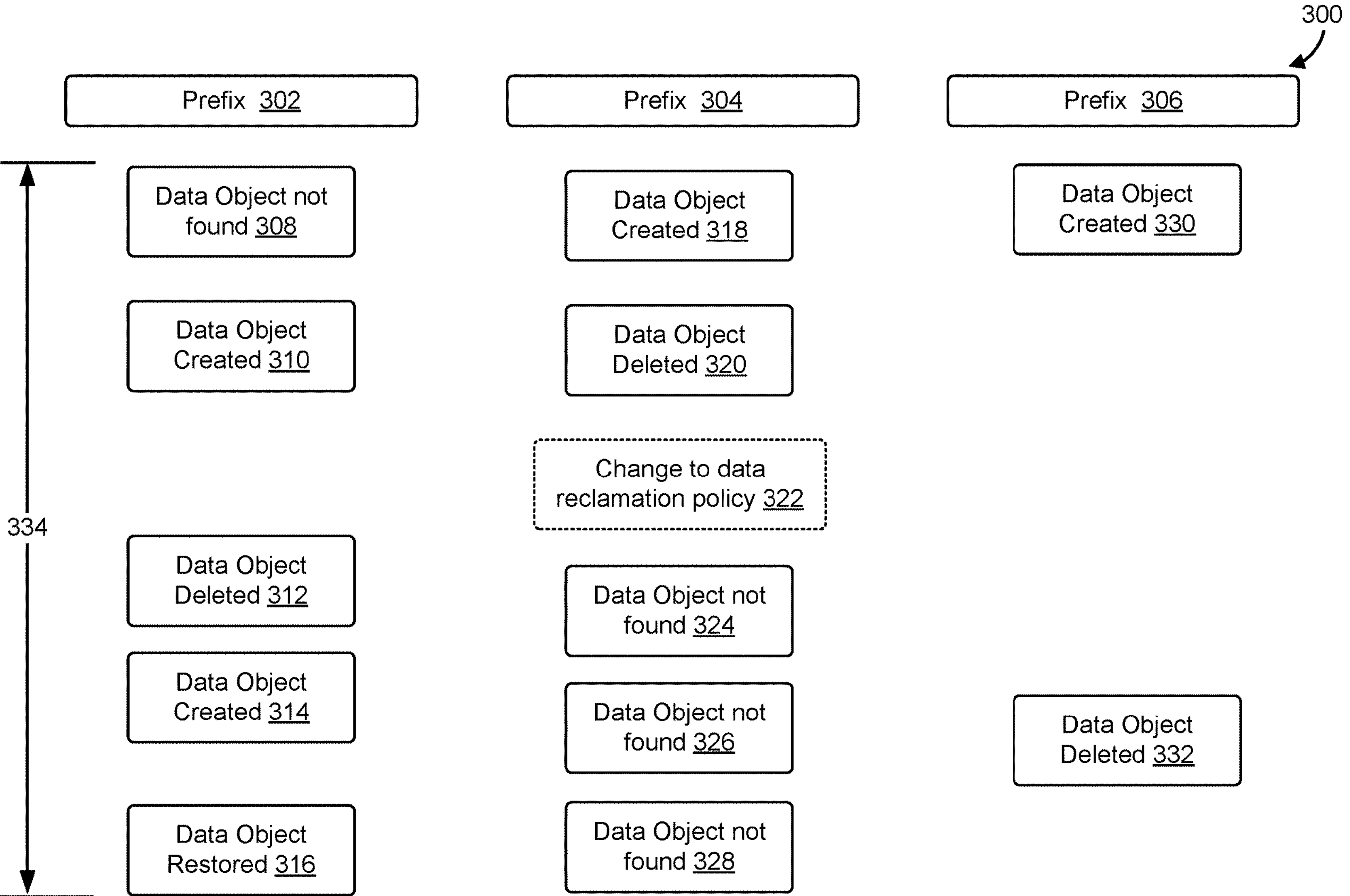
FIG. 3 illustrates an example of an event stream generated by an event distribution layer of FIG. 1, according to at least one embodiment.

FIG. 3 illustrates an example of event data 300, such as event data 226 as may be generated by an event distribution layer 120 or a data storage service 122 as described above in reference to FIGS. 1 and 2. In a first example, event data 300 may be used to train one or more models, such as models 114, 206, 208, to be used to detect anomalous events for a given data store or data storage service partition or logical data container. In a second example, event data 300 may be input into one or more models, which may already be trained, to detect anomalies in the event data 300.

As illustrated, various events, as may be generated in response to request to perform actions on data objects, may be associated with different prefixes or other identifiers or grouping of data objects. A prefix may identify a certain group a data object belongs to, a feature or characteristic of a data object, such as folder or file the data object is associated with. In other data storage systems, various other attributes of data objects may be used, such as file/folder convention, or other relational and non-relational data storage conventions. Data object prefix or other similar organizational identifier may be one way to separate and organize events from a logical data container, to enable more granular training of a model to detect anomalies. In other cases, other data or metadata of the data objects themselves, may be used in addition to or alternatively to prefix, such as customer tag information associated with at least one of the events, a storage class of the data object associated with at least one of the events, a logical data container of the data object associated with at least one of the events, or a creation data of the data object associated with at least one of the events.

In one example, events for data objects having a prefix 302 over a time period 334 may have one event 308 in which an object is not found. In some examples, event 308 may be associated with an error code or value, such as an HTTP error code, indicating that a data object that was requested to be accessed, could not be found. This type or event or error may be a good indication that data was mistakenly deleted. In one example, a single occurrence of an object not found event 308 in time period 334 may not indicate an anomaly. This may be determined, for example in a number of different ways, such as via no subsequent action being taken to retrieve the deleted object, based on other historical event data where this number of similar error codes 308 occur at the same frequency over a long duration of time, and so on. As illustrated, there may be a number of other events for data objects having a prefix 302 during time period 334 that may not indicate any errors, such as data object created events 310, and 314, data object deleted 312, and data object restored 316.

In another example, events for data objects having a prefix 304, may include a number of successive data not found events or error codes 324, 326, 328. This may be determined to be an anomaly, in a number of different ways, including the number of error codes or successive error codes that happen in a subset of time period 334, based on historical event data, or based on other known or obtained information concerning operation of the data storage service, such as a change to a data reclamation policy 322. As used herein, a data reclamation policy may include or direct when stored data is permanently deleted, such as when that data become stale, is not accessed, and/or is beyond a configurable age. In some aspects, a data reclamation policy may also direct how long a data object is stored in temporary storage, for example, after a deletion event occurs, such as to enable the recovery of that data object in case the deletion was inadvertent. In the example of FIG. 3, a change to the data reclamation policy may include changing the time period a deleted data object is stored before being permanently deleted.

In some cases, one or more patterns may be detected in the event data for a given prefix or across multiple prefixes, such as the occurrence of certain error codes 324, 326, 328 either in isolation, or relative to other events or error codes, such as data object deleted events 318, 320. In yet another example, events for data objects having prefix 306 over time period 334 may only include two events, one indicate an object was created 330 and another indicating that an object was deleted 332, such that no anomaly may be inferred from the events.

In some aspects, the training of one or more detection models based on event data 300 may include obtaining tags that indicate whether certain events correspond to an anomaly. In other cases, the occurrence of an anomaly may be inferred from other data, including actions taken after certain events or before certain events.

Figure 4:
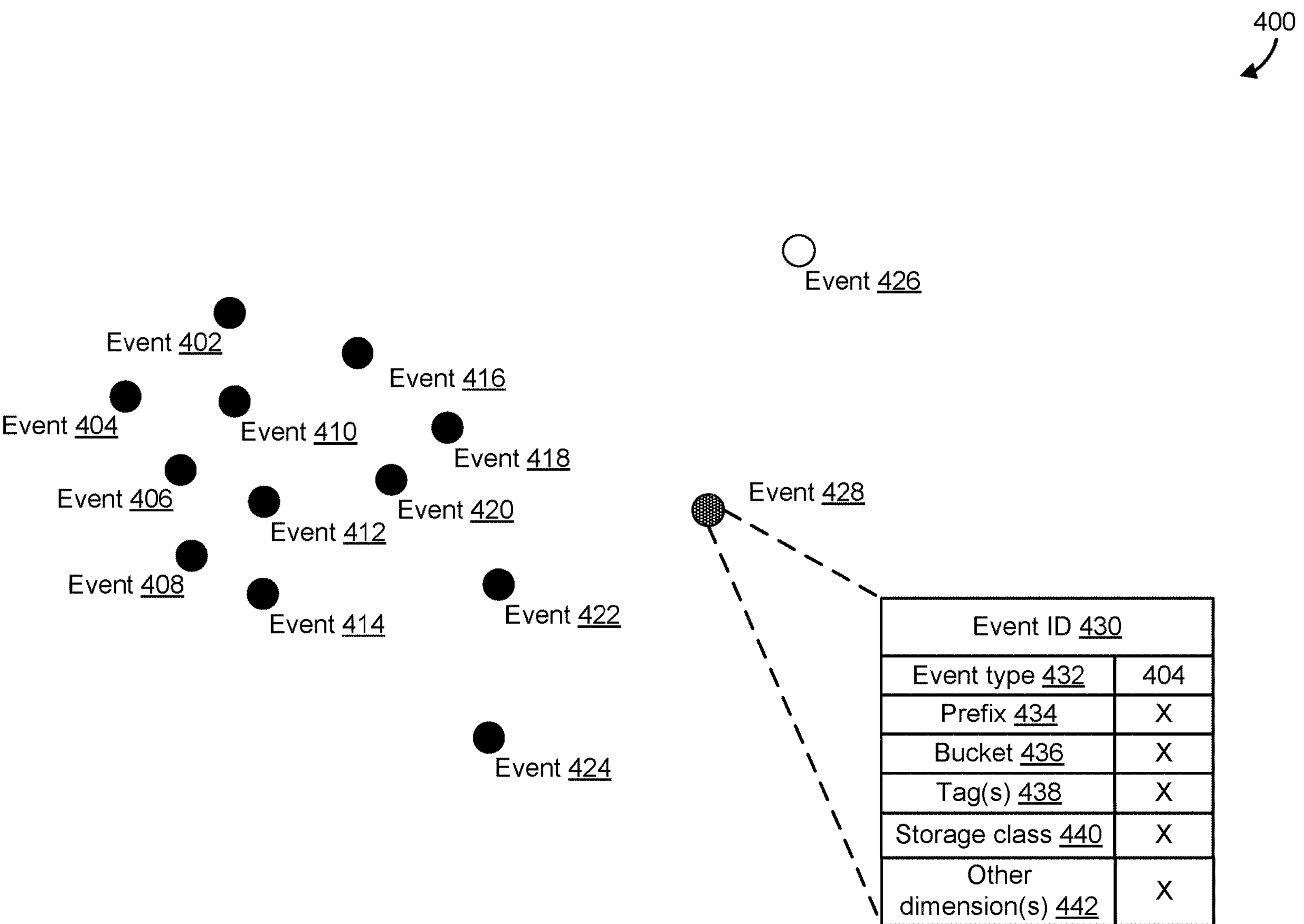
FIG. 4 illustrates an example representation of events of an event stream, which may be used by an anomaly detection service, according to at least one embodiment.

FIG. 4 illustrates an example representation 400 of events of an event stream, which may be used by an anomaly detection service, according to at least one embodiment. The various data points illustrated in representation 400 may represent various events in a one to n dimensional data structure. In one example, the representation of events 400 may be used to detect anomalies in the events 402-428, such as using a robust random cut forest model or algorithm.

As illustrated, each event may be associated with various pieces of information or metadata, including one or more of an event ID 430, an event type 432, a prefix associated with the relevant data object(s) 434, a bucket or logical data container associated with the relevant data object(s) 436, any of a variety of tag information 438, such as provided by a customer, a storage class identifier 440 which may identify which type of storage (on demand, durable, archive, etc.) the data object is stored in, or other dimensions 442.

The representation of the events 402-428 may be utilized to detect when one or more events deviate in at least one dimension from the group of events 402-428, to a certain extent, such as illustrated by events 428, 426. In one example, event 428 may indicate a potential anomaly, but because it does not deviate from the rest of the events to a certain degree, it may not be flagged as anomaly, whereas event 426 may deviate from the other events to a certain degree in one or more dimesons, as to be flagged as an anomaly.

Figure 5:
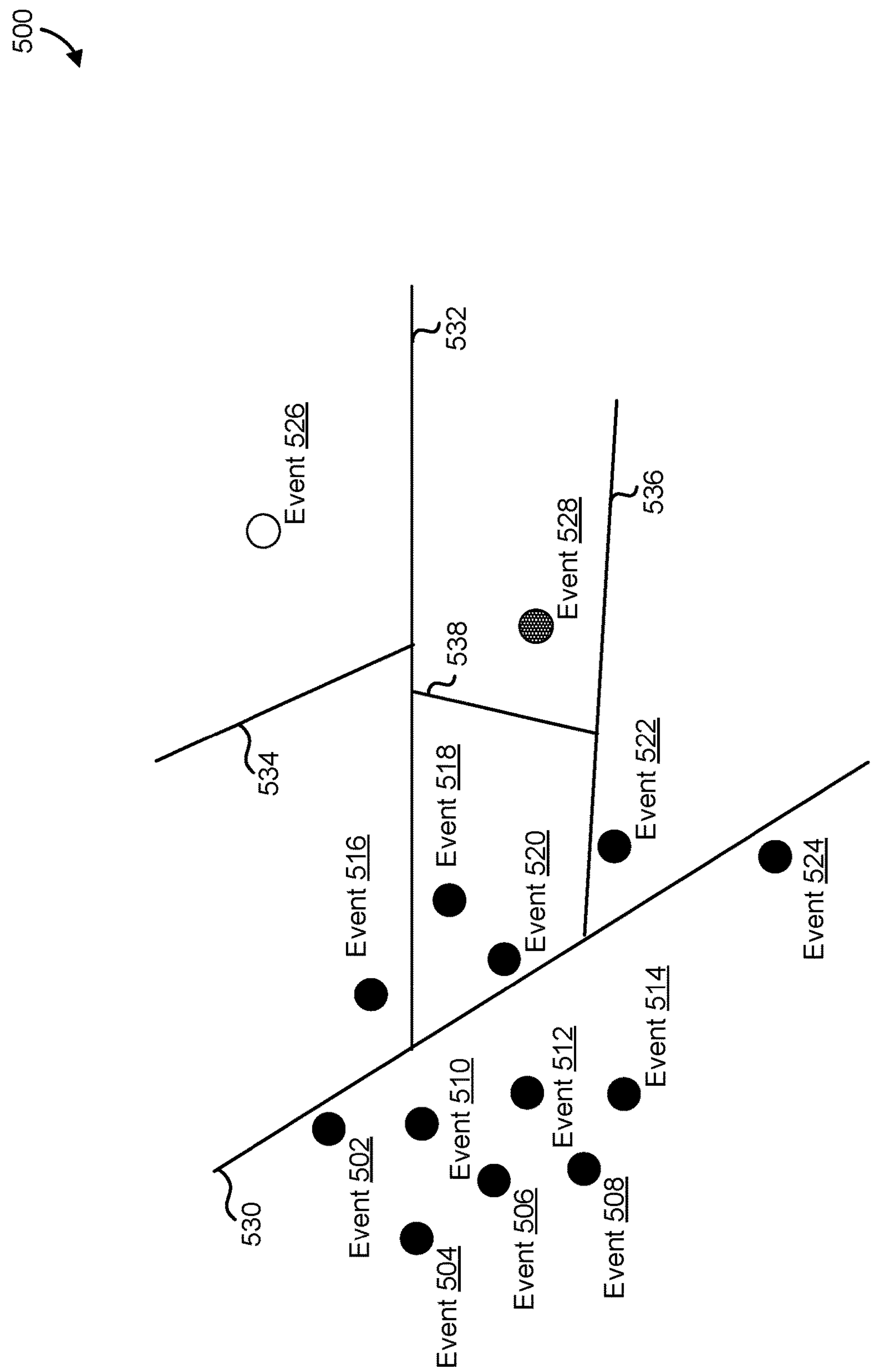
FIG. 5 illustrates an example application of a random cut forest model to the representation of events of FIG. 4, according to at least one embodiment.

FIG. 5 illustrates an example application 500 of a robust random cut forest model to the representation of events 400 described above in reference to FIG. 4, to determine if one or more events presents an anomaly. As illustrated, a set of events 502-528 may be represented in a multi-dimensional space. To determine if one or more events indicates an anomaly, the set of events 502-528 may be divided a number of times, at random locations, to isolate a given event. The number of divisions, which may be represented by a tree structure, may be determined and used to evaluate whether a given event deviates from the rest of the events to a degree to indicate an anomaly. For example, it may take divisions 530, 532, and 534 to isolate event 526. In another example, it may take divisions 530, 532, 536, and 538 to isolate event 528. The larger the number of divisions needed to isolate an event, the less likely that event is an anomaly. This process of dividing the subset of events 502-528 up to isolate single event may be performed a number of times, and the average number of divisions determined. This average number of divisions, in some cases, may be compared to the number of divisions to one or a number of other events to determine if the event of interest should be identified as an anomaly.

Figure 6:
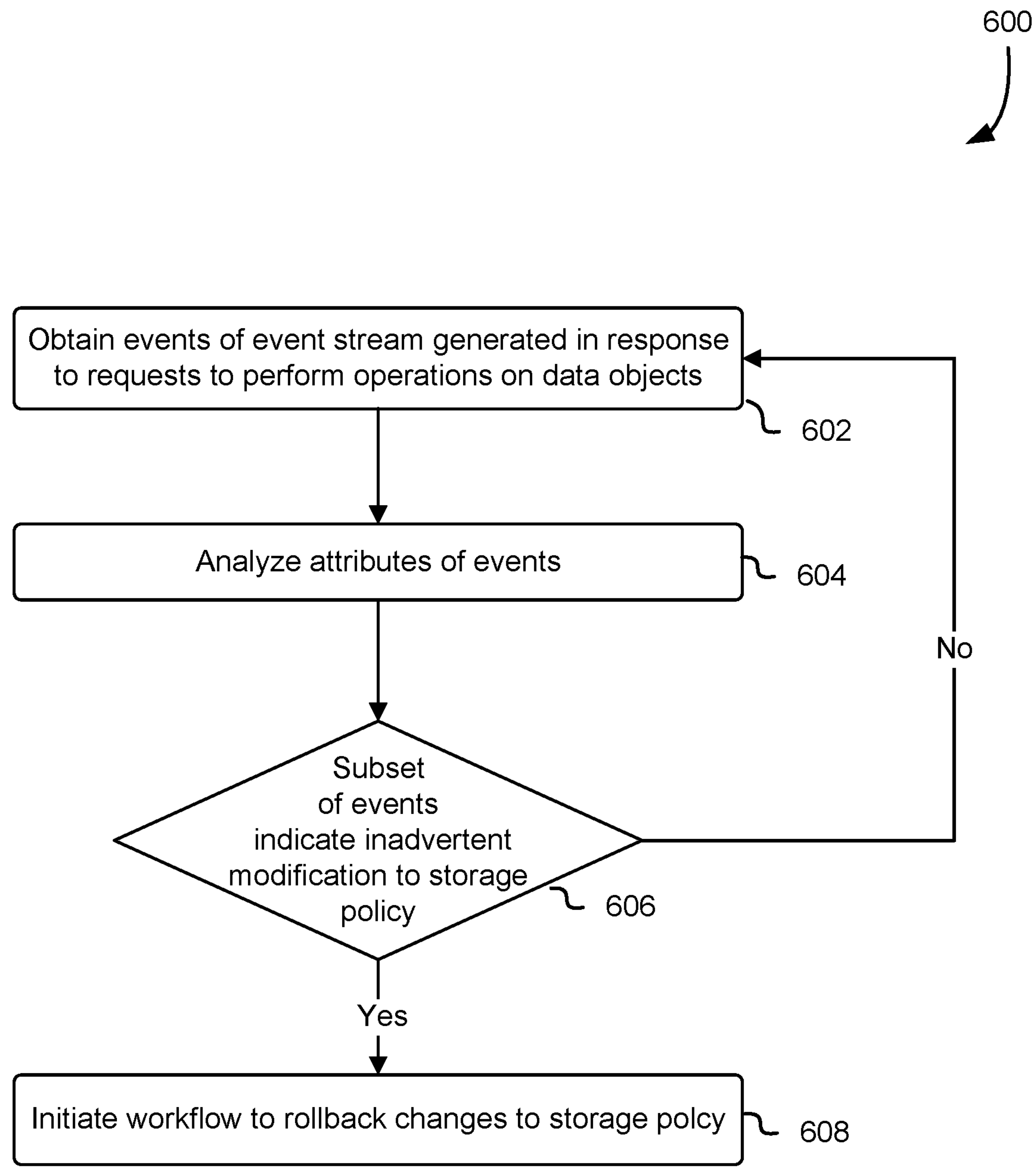
FIG. 6 illustrates an example process for detecting anomalous changes to a storage policy and initiating a workflow to roll back the changes to the policy, according to at least one embodiment.

FIG. 6 illustrates an example process 600 for detecting inadvertent or anomalous changes to a policy affecting the storage of data initiating a workflow to rollback those changes, according to at least one embodiment. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as a server in accordance with those described in connection with FIG. 8. In some aspects, operations of process 600 may be performed by the anomaly detection service 112, 202, and components thereof, as described above in reference to FIGS. 1 and 2. In some examples, the anomaly detection may interact with other services and systems, such as the data storage service 122, the event distribution layer 120, the event store 118, and/or a computing resource service provider 102, as described above in reference to FIG. 1.

Process 600 may begin at operation 602, where events of an event stream generated in response to requests to perform operations on data objects may be obtained. In some cases, the events may be obtained by an anomaly detection service from a data storage service or through an event distribution layer or event store, as described above. The events may include various metadata, as described above, some of which may include error code values indicated that failure to perform one or more operations of data.

Next, at operation 604, one or more attributes of events or a subset of the events may be analyzed. The one or more attributes may include one or more time of occurrence, frequency of occurrence, type of event/error, type of event/error relative to other events/errors, event/error relative in time to other inferred or detected events (e.g., change to storage class archiving policy, change to permission policy, etc.), prefix of event/error, frequency of event/error with certain prefix, etc.

Next, at operation 606, it may be determined if at least a subset of the events indicate an inadvertent modifications to a storage policy. Operations 604 and 606 may include using one or more attributes of the events or error values in the events to determine that at least a subset of the events/error values are indicative of one or more inadvertent modifications to a policy affecting storage of or access to the data objects. In some cases, operation 606 may include utilizing one or more machine learning models, as described above. In other cases, operation 606 may include using other models or predictive or analytic techniques to identify anomalous events that likely indicate that a policy affecting data storage has been inadvertently modified. The policy may include a data reclamation policy, a permission policy, an archival or storage class policy, a configuration or other system type policy, etc.

If at least the subset of events/errors indicate an anomalous change to a policy, at operation 606, a workflow may be initiated or actions taken to roll back the changes to the policy that caused the errors, at operation 608. In some cases, operation 608 may include suspending a background data reclamation process that permanently removes deleted data objects from the data storage service, reverting to a prior configuration of the policy before at least the subset of the error values was generated, and/or sending a notification to an account responsible for the data objects in the data storage service indicating the one or more inadvertent modifications to the policy. If no anomaly is detected at operation 606, process 60 may loop back to operation 602.

Figure 7:
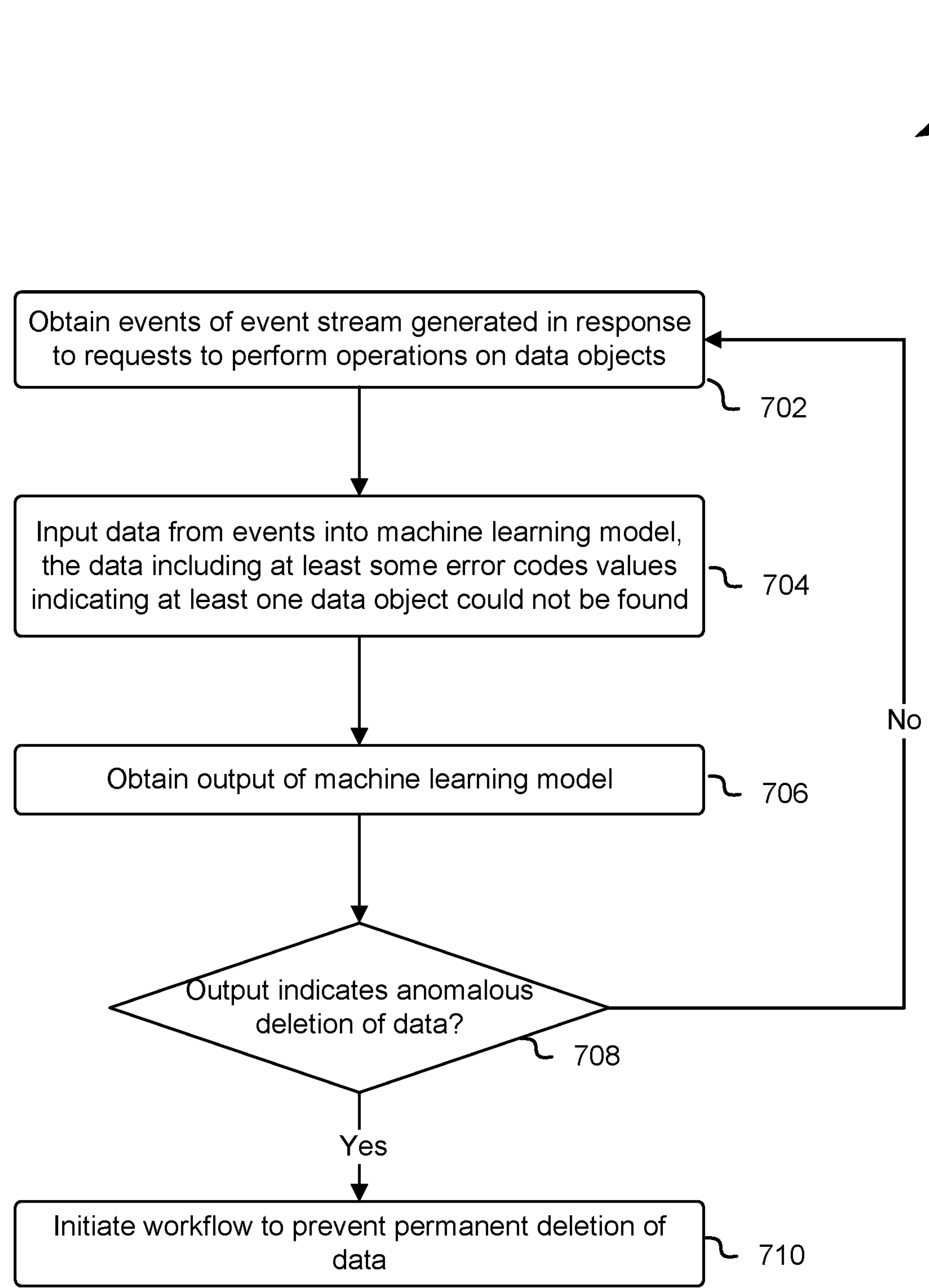
FIG. 7 illustrates an example process for detecting anomalous deletion of data and initiating a workflow to prevent permanent deletion of the data, according to at least one embodiment.

FIG. 7 illustrates an example process 700 for detecting anomalous deletion of data and initiating a workflow to prevent permanent deletion of the data, according to at least one embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as a server in accordance with those described in connection with FIG. 8. In some aspects, operations of process 700 may be performed by the anomaly detection service 112, 202, and components thereof, as described above in reference to FIGS. 1 and 2. In some examples, the anomaly detection may interact with other services and systems, such as the data storage service 122, the event distribution layer 120, the event store 118, and/or a computing resource service provider 102, as described above in reference to FIG. 1.

Process 700 may begin at operation 702, where events of an event stream generated in response to requests to perform operations on data objects may be obtained. In some cases, the events may be obtained by an anomaly detection service from a data storage service or through an event distribution layer or event store, as described above. The events may include various metadata, as described above, some of which may include error code values indicated that failure to perform an operation, such as that a data object cannot be found in response to a read request.

Next, at operation 704, data from the events may be input into a model, such as a machine learning model, where the data include at least some error codes. In some cases, process 700 may be initiated based on the occurrence of one or a threshold number of specific error codes, such as that a data object cannot be found. In some cases, the machine learning model may be specific to a data store or logical data container, various data stored on behalf of a certain customer etc. In some instances, the machine learning model may be a robust random cut forest model or other machine learning model.

Next, at operation 706, an output of the model or machine learning model may be obtained. The out output may indicate whether the events indicate that an anomaly has occurred, and in some cases a confidence value associated with that determination. If an anomaly has been detected, as determined at operation 708, one or more workflows may be initiated to prevent the permanent deletion of data, at operation 710. Operation 710 may include any of a variety of actions or workflows, as described in greater detail above in reference to FIG. 2. In some aspects, operation 710 may include delaying execution of a data reclamation policy (e.g., permanent deletion of data), and sending a notification to the customer, to enable the customer to take action to prevent the deletion of the data from becoming permanent. In some cases, operation 710 may be performed globally, or on a more granular basis, such as on a subset of data objects in the data storage service or logical data container of the data storage service. In some cases, the subset of data objects for which operation 710 may be performed may be defined by one or more dimensions, such as time, prefix, tag information, etc. In some aspects that dimension or dimensions of the subset may correspond to set of dimensions that triggered the anomaly detection in the first instance.

If no anomaly is detected, at operation 708, process 700 may loop back to operation 702 and repeat, such as after the passage of a configurable amount of time or upon satisfaction of trigger event, such as a number of new events being generated and/or received.

Figure 8:
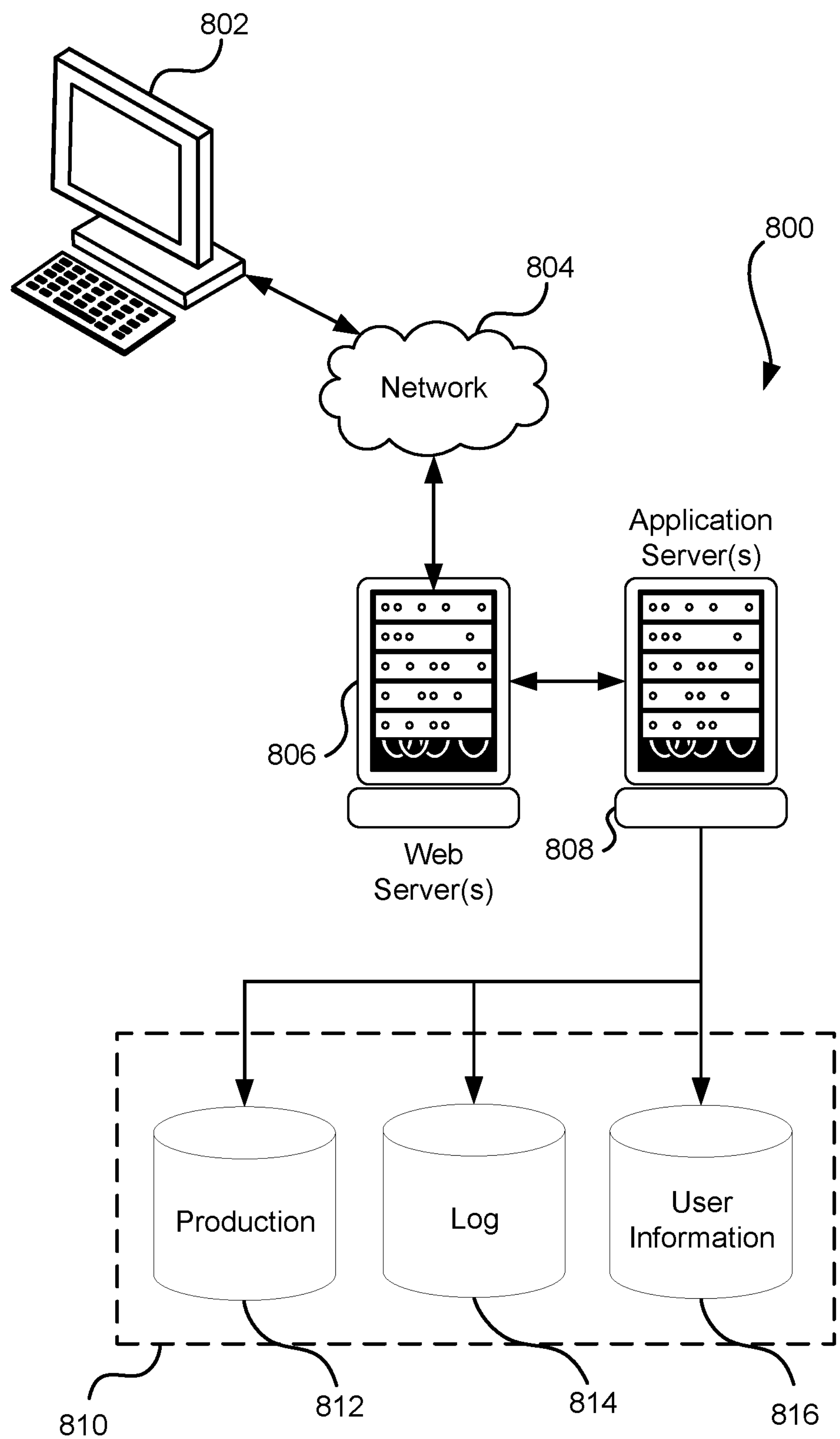
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term “data store” refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language (“HTML”), Extensible Markup Language (“XML”), JavaScript, Cascading Style Sheets (“CSS”), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor (“PHP”), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:

obtaining events of an event stream generated, at least in part, as a result of application programming interface (API) requests to perform read operations on data objects stored in a logical data container of a data storage service;

inputting data from at least a plurality of the events into a machine learning model, the data comprising hypertext transfer protocol (HTTP) error code values for at least some of the plurality of events, the HTTP error code values indicating respective failures to perform requested operations as a result of respective data objects not being found;

obtaining output of the machine learning model, corresponding to the data input into the machine learning model, that indicates whether a set of the events represent anomalous deletion of data in the logical data container; and as a result of the output of the machine learning model indicating that the set of the events represent anomalous deletion of data in the logical data container, initiating a workflow to prevent permanent deletion of the data.

2. The computer-implemented method of claim 1, wherein the machine learning model maps the data input into the machine learning model according to at least one of a data object prefix associated with at least one of the events, time of occurrence of at least one of the events, customer tag information associated with at least one of the events, a storage class of the data object associated with at least one of the events, a logical data container of the data object associated with at least one of the events, or creation data of the data object associated with at least one of the events.

3. The computer-implemented method of claim 1, wherein the machine learning model comprises a robust random cut forest model.

4. The computer-implemented method of claim 1, wherein the workflow comprises at least one of suspending a background data reclamation process to remove deleted data objects from the data storage service or reverting to a prior configuration of the logical data container prior to the at least one data object not being found.

5. A system, comprising: one or more processors; and memory that stores computer-executable instructions that, as a result of being executed, cause the one or more processors to:

obtain error values generated as a result of failures to fulfill requests to perform operations on data objects in a data storage service, wherein at least some of the error values indicate that at least one of the data objects cannot be found;

use one or more attributes of the error values, determine that at least a subset of the error values are indicative of one or more inadvertent modifications to a policy affecting storage of or access to the data objects; and as a result of determining that at least the subset of the error values are indicative of one or more inadvertent modifications to the policy, perform a set of operations to mitigate an effect of the one or more inadvertent modifications to the policy that resulted in at least the subset of error values.

6. The system of claim 5, wherein performing the set of operations to mitigate the effects of the one or more inadvertent modifications to the policy further comprises suspending a background data reclamation process that permanently removes deleted data objects from the data storage service.

7. The system of claim 5, wherein performing the set of operations to mitigate the effects of the one or more inadvertent modifications to the policy further comprises reverting to a prior configuration of the policy before at least the subset of the error values was generated.

8. The system of claim 7, wherein the policy comprises a permissions policy that controls access to the data objects or a storage policy that controls when individual of the data objects are moved to archival data storage.

9. The system of claim 5, wherein performing the set of operations to mitigate the effects of the one or more inadvertent modifications to the policy further comprises sending a notification to an account responsible for the data objects in the data storage service indicating the one or more inadvertent modifications to the policy.

10. The system of claim 5, wherein determining that at least the subset of the error values are indicative of one or more inadvertent modifications to the policy further comprises using a machine learning model, wherein the instructions that, as a result of being executed, further cause the one or more processors to train the machine learning model based at least in part on prior error values generated as a result of failures to fulfill requests to perform operations on other data objects in the data storage service and at least one of prefix information associated with at least one of the other data objects, customer tag information associated with at least one of the other data objects, storage class information associated with at least one of the other data objects, or a logical data container used to store at least one of the other data objects.

11. The system of claim 10, wherein training the machine learning model is further based on one or more events indicative of successful performance of operations on the other data objects.

12. The system of claim 5, wherein determining that at least the subset of the error values are indicative of one or more inadvertent modifications to the policy further comprises identifying a pattern of a least the subset of error values based on the one or more attributes of the error values.

13. The system of claim 5, wherein the error values indicate that at least one of the data objects cannot be found.

14. A non-transitory computer-readable storage medium storing thereon executable instructions that, as a result of being executed by one or more processors of a computer system, cause the computer system to at least:

obtain events generated as a result of requests to perform operations on data objects in a data storage service, at least some of the events indicating failure to fulfill respective requests;

input data from the events into a machine learning model to detect an anomaly indicative of inadvertent modification of data; and as a result of detection of the anomaly, perform a set of operations to prevent the inadvertent modification of data from becoming permanent.

15. The non-transitory computer-readable storage medium of claim 14, wherein performing the set of operations to prevent the inadvertent modification of data from becoming permanent further comprises:

delaying performance of a background data reclamation process that permanently removes deleted data objects from the data storage service; and sending a notification to an account responsible for the data objects in the data storage service indicating modification of the data.

16. The non-transitory computer-readable storage medium of claim 14, wherein performing the set of operations to prevent the inadvertent modification of data from becoming permanent further comprises reverting to a prior configuration of the data storage service in operation before the at least some of the events were generated.

17. The non-transitory computer-readable storage medium of claim 14, wherein the instructions further comprise instructions that, as a result of being executed by the one or more processors, cause the computer system to train the machine learning model based at least in part on:

prior events generated as a result of requests to perform operations on other data objects in the data storage service; and metadata associated with the prior events.

18. The non-transitory computer-readable storage medium of claim 17, wherein the metadata comprises at least one of: at least one of prefix information associated with at least one of the other data objects, customer tag information associated with at least one of the other data objects, storage class information associated with at least one of the other data objects, or a logical data container used to store at least one of the other data objects.

19. The non-transitory computer-readable storage medium of claim 17, wherein training the machine learning model further comprises:

determining anomaly values for prior events by comparing individual prior events with a set of prior events.

20. The non-transitory computer-readable storage medium of claim 14, wherein at least some of the events indicating failure to fulfill respective requests further indicate that at least one of the data objects cannot be found.

21. The non-transitory computer-readable storage medium of claim 14, wherein the inadvertent modification of the data further comprises the inadvertent deletion of the data.

* * * * *